(12) United States Patent
Choi

(10) Patent No.: US 10,382,198 B2
(45) Date of Patent: Aug. 13, 2019

(54) DEVICE AND METHOD FOR SUPPLYING KEY TO PLURALITY OF DEVICES IN QUANTUM KEY DISTRIBUTION SYSTEM

(71) Applicant: ID Quantique SA., Genève (CH)

(72) Inventor: Jeongwoon Choi, Seoul (KR)

(73) Assignee: ID QUANTIQUE, Genève (CH)

( * ) Notice: Subject to any disclaimer, the term of this patent is extended or adjusted under 35 U.S.C. 154(b) by 153 days.

(21) Appl. No.: 15/499,153

(22) Filed: Apr. 27, 2017

(65) Prior Publication Data

US 2017/0230173 A1   Aug. 10, 2017

Related U.S. Application Data

(63) Continuation of application No. PCT/KR2015/010600, filed on Oct. 7, 2015.

(30) Foreign Application Priority Data

Oct. 30, 2014   (KR) .......................... 10-2014-0149636

(51) Int. Cl.
*H04L 9/08* (2006.01)
*H04L 9/12* (2006.01)
*H04L 9/14* (2006.01)

(52) U.S. Cl.
CPC .......... *H04L 9/0852* (2013.01); *H04L 9/0861* (2013.01); *H04L 9/0891* (2013.01); *H04L 9/0894* (2013.01); *H04L 9/12* (2013.01); *H04L 9/14* (2013.01)

(58) Field of Classification Search
None
See application file for complete search history.

(56) References Cited

U.S. PATENT DOCUMENTS

| 7,809,143 B2 * | 10/2010 | Young ................... H04B 10/70 380/253 |
| 2005/0193199 A1 | 9/2005 | Asokan et al. |
| 2006/0088157 A1 * | 4/2006 | Fujii ..................... H04L 9/0858 380/30 |
| 2007/0098402 A1 * | 5/2007 | Maeda ................... H04B 10/66 398/38 |

FOREIGN PATENT DOCUMENTS

| JP | 2004350259 A | 12/2004 |
| JP | 2007053591 A | 3/2007 |
| JP | 5431365 B2 | 3/2014 |
| KR | 1020140055146 A | 5/2014 |

OTHER PUBLICATIONS

International Search Report for PCT/KR2015/010600 dated Jan. 14, 2016.

* cited by examiner

*Primary Examiner* — Brandon S Hoffman
(74) *Attorney, Agent, or Firm* — Hauptman Ham, LLP

(57) ABSTRACT

The present disclosure in some embodiments provides an apparatus and method for supplying quantum keys to multiple apparatuses in a quantum key distribution system. According to some embodiments of the present disclosure, an apparatus and method for supplying quantum keys enable Alice or Bob to deliver the quantum keys to the multiple transmitting apparatuses or receiving apparatuses, in real time without a delay.

19 Claims, 6 Drawing Sheets

DEVICE AND METHOD FOR SUPPLYING KEY TO PLURALITY OF DEVICES IN QUANTUM KEY DISTRIBUTION SYSTEM

CROSS-REFERENCE TO RELATED APPLICATION

The present application is a continuation application of International Patent Application No. PCT/KR2015/010600, filed Oct. 7, 2015, which claims priority to Korean Patent Application No. 10-2014-0149636, filed on Oct. 30, 2014. The disclosures of the above-listed applications are hereby incorporated by reference herein in their entirety.

TECHNICAL FIELD

The present disclosure in some embodiments relates to an apparatus and a method for supplying a key to multiple devices in a quantum key distribution system.

BACKGROUND

The statements in this section merely provide background information related to the present disclosure and do not necessarily constitute prior art.

FIG. 1 is a block diagram of a conventional communication system using a quantum key distribution system.

Referring to FIG. 1, the conventional communication system using a quantum key distribution system includes a quantum key distribution system transmitter 110, a quantum key distribution system receiver 120, a plurality of transmitting apparatuses 130, 135, and a plurality of receiving apparatuses 140, 145.

The quantum key distribution system transmitter 110 (hereinafter referred to as "Alice") and the quantum key distribution system receiver 120 (hereinafter referred to as "Bob") utilize a public channel and a quantum channel to generate a quantum key which they share.

The transmitting apparatuses 130, 135 and the receiving apparatuses 140, 145 receive the quantum keys generated by and distributed from Alice and Bob, respectively, and they send and receive data or data packets encrypted by using the quantum keys. In practice, the transmitting apparatuses and the receiving apparatuses have a two-way secure communication function to respectively perform data transmission and reception functions at the same time or to perform simultaneous encryption and decryption functions. However, in the present disclosure, for the sake of convenience, secure communication equipments that are linked with Alice in the quantum key distribution system are referred to as transmitting apparatuses, and secure communication equipments that are linked with Bob in the quantum key distribution system are referred to as receiving apparatuses.

The existing communication system utilizing a quantum key distribution system has some trouble, when it has multiple transmitting apparatuses or receiving apparatuses and where these apparatuses request quantum keys from Alice or Bob at a similar time point. When or whenever the multiple transmitting apparatuses or the respective receiving apparatuses respectively make the nearly simultaneously quantum key requests to Alice or Bob for the quantum key, Alice and Bob remain inoperative for the next request until a previous quantum key request is completely served for the transmitting apparatuses and the receiving apparatuses before processing the next request. Due to their suspended processing of the subsequent request until fulfilling the previous one of the multiple distribution requests for the quantum key, when supplying the quantum key to the multiple transmitting apparatuses or receiving apparatuses, Alice alone and Bob are constrained by a delay of supply in distributing the quantum key.

Further, when Alice or Bob has depleted all of quantum keys in their storages to fulfill the requests of a plurality of transmitting apparatuses or receiving apparatuses, the existing communication system needs to replenish the storages with new quantum keys, resulting in inconvenient breaks of the quantum key supplement to by the transmitting apparatuses or receiving apparatuses.

DISCLOSURE

Technical Problem

Therefore, the present disclosure seeks to provide an apparatus and a method for enabling Alice and Bob of a quantum key distribution system to supply quantum keys to multiple transmitting apparatuses and multiple receiving apparatuses in real time without a delay.

SUMMARY

In accordance with at least one aspect of the present disclosure, a transmitting apparatus (Alice) of a quantum key distribution system includes a quantum key providing unit. The quantum key providing unit is configured to receive a quantum key distribution request signal from an external transmitting apparatus, and to transfer the quantum key distribution request signal to a quantum key storage unit. And the quantum key storage unit includes a plurality of storage units and is configured to irrespective of receiving the quantum key distribution request signal, generate quantum keys and store the quantum keys sequentially in the plurality of storage units, and in response to receiving the quantum key distribution request signal from the quantum key providing unit, supply a quantum key stored in one storage unit among the plurality of storage units and an identifier of the quantum key to the quantum key providing unit. The quantum key providing unit is further configured to receive the quantum key and the identifier of the quantum key from the quantum key storage unit and provide the external transmitting apparatus with the quantum key and the identifier of the quantum key. In some embodiments, irrespective of receiving the quantum key distribution request signal, the quantum key storage unit generates the quantum keys by operating a dedicated quantum key distribution protocol through a public channel and a quantum channel between Alice and Bob (a receiving apparatus), and stores the quantum keys sequentially in the plurality of storage units.

In accordance with another aspect of the present disclosure, a receiving apparatus (Bob) of a quantum key distribution system includes a quantum key providing unit. The quantum key providing unit is configured to receive, from an external receiving apparatus, an identifier of a quantum key having been provided by a transmitting apparatus of the quantum key distribution system to an external transmitting apparatus and finally to the external receiving apparatus, and a quantum key distribution request signal, and to transfer the quantum key distribution request signal with the identifier of the quantum key to a quantum key storage unit. And the quantum key storage unit includes a plurality of storage units and is configured to, irrespective of receiving the quantum key distribution request signal, generate quantum keys and store the quantum keys sequentially in the plurality of storage units, and in response to receiving the identifier of the quantum key and the quantum key distribution request signal from the quantum key providing unit, extract the quantum key corresponding to the identifier of the quantum key from one storage unit among the plurality of storage units, and supply an extracted quantum key to the quantum key providing unit. The quantum key providing unit is further configured to receive the extracted quantum key from the quantum key storage unit and provide the external receiving apparatus with the extracted quantum key. In some embodiments, irrespective of receiving the quantum key distribution request signal, the quantum key storage unit generates quantum keys by operating a dedicated quantum key distribution protocol through a public channel and a quantum channel between Alice and Bob (a receiving apparatus), and stores the quantum keys sequentially in the plurality of storage units In accordance with yet another aspect of the present disclosure, a method performed by a transmitting apparatus (Alice) of a quantum key distribution system, includes receiving, by a quantum key providing unit, from an external transmitting apparatus, a quantum key distribution request signal for requesting a quantum key having been provided by the transmitting apparatus (Alice) of the quantum key distribution system to the external transmitting apparatus, and transferring, by the quantum key providing unit, the quantum key distribution request signal to a quantum key storage unit, and irrespective of receiving the quantum key distribution request signal, generating, by the quantum key storage unit, quantum keys and storing the quantum keys sequentially in a plurality of storage units, and upon receiving the quantum key distribution request signal from the quantum key providing unit, supplying, by the quantum key storage unit, a quantum key stored in one storage unit among the plurality of storage units and an identifier of the quantum key to the quantum key providing unit, and providing, by the quantum key providing unit, the external transmitting apparatus with the quantum key and the identifier of the quantum key.

Advantageous Effects

According to at least one embodiment as described above, Alice or Bob, even at multiple requests for quantum key distribution, can supply the quantum keys in real time without a delay.

In addition, when Alice or Bob has supplied every one of quantum keys and thus they are required to replenish new quantum keys, the present system provides an uninterrupted supply of quantum keys to the transmitting apparatuses and receiving apparatuses.

DETAILED DESCRIPTION

Figure 1:
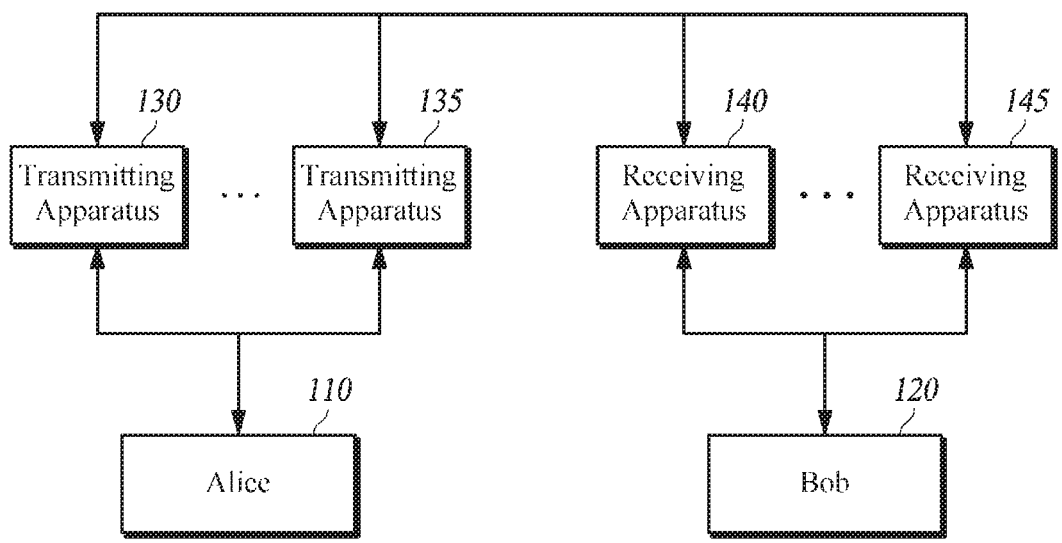
FIG. 1 is a block diagram of a conventional communication system using a quantum key distribution system.

Hereinafter, at least one embodiment of the present disclosure will be described in detail with reference to the accompanying drawings. In the following description, like reference numerals designate like elements, although the elements are shown in different drawings. Further, in the following description of the at least one embodiment, a detailed description of known functions and configurations incorporated herein will be omitted for the purpose of clarity and for brevity.

Additionally, various terms such as first, second, A, B, (a), (b), etc., are used solely for the purpose of differentiating one component from the other but not limited to imply or suggest the substances, the order or sequence of the components. Throughout this specification, when a part "includes" or "comprises" a component, the part is meant to further include other components, not excluding thereof unless there is a particular description contrary thereto. The terms such as "unit", "module", and the like refer to units for processing at least one function or operation, which may be implemented by hardware, software, or a combination thereof.

Figure 2:
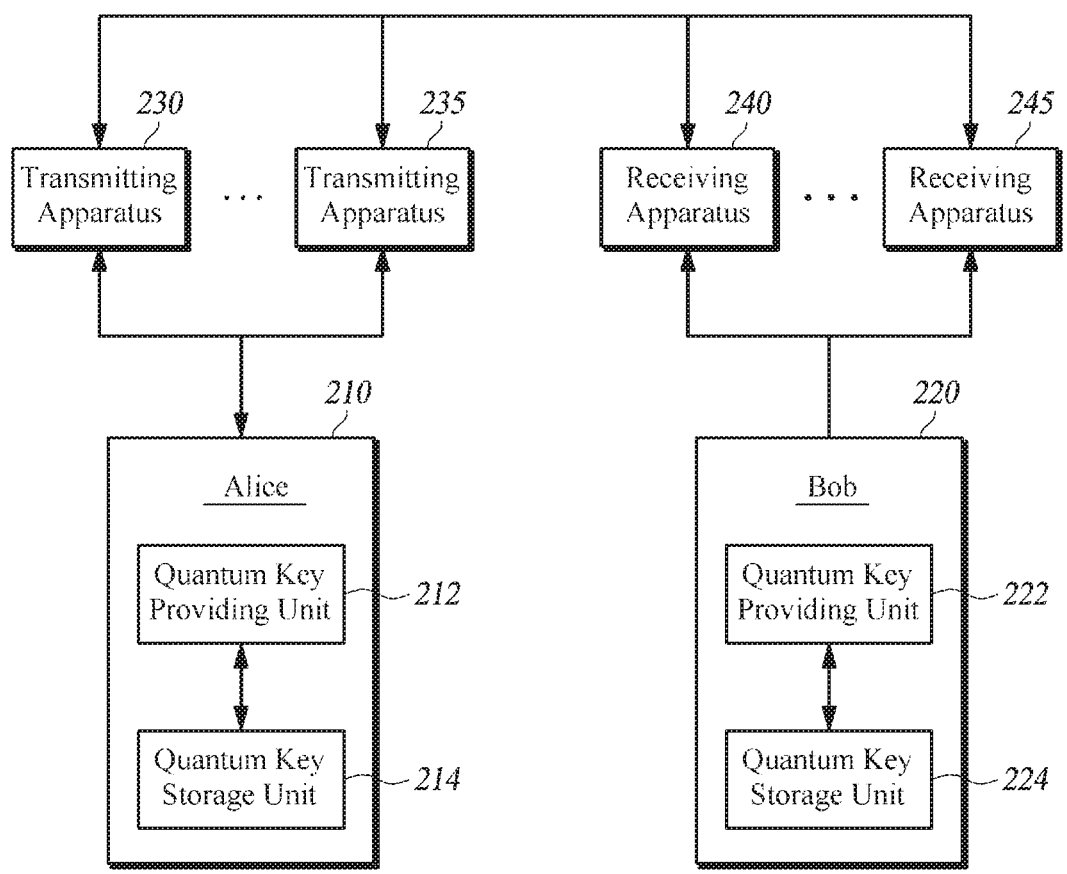
FIG. 2 is a block diagram of a communication system using a quantum key distribution system, according to at least one embodiment of the present disclosure.

FIG. 2 is a block diagram of a communication system using a quantum key distribution system, according to at least one embodiment of the present disclosure.

Referring to FIG. 2, the communication system using a quantum key distribution system includes an Alice 210, a Bob 220, and a plurality of transmitting apparatuses 230, 235, and a plurality of receiving apparatuses 240, 245.

Alice 210 and Bob 220 generate quantum keys by using a public channel and a quantum channel. Alice 210 and Bob 220 respectively include quantum key providing units 212, 222 as suppliers of the quantum keys, and quantum key storage units 214, 224. In at least one embodiment, the quantum key providing unit (hereinafter referred to as "QKPU") is implemented by a CPU (Central Processing Unit), and the quantum key storage unit (hereinafter referred to as "QKSU") is implemented by a FPGA (Field-Programmable Gate Array).

The QKPU 212 serves to distribute and manage the generated quantum key. In operation, the QKPU distributes a quantum key exclusively to an authenticated transmitting apparatus. Therefore, an authentication is required when the transmitting apparatus initiates a connection with the QKPU, and only the authenticated transmitting apparatus may request a quantum key to the QKPU. Upon receiving the request for a quantum key from the authenticated transmitting apparatus, the QKPU requests the quantum key to the QKSU 214. The QKPU stores a list of authenticated transmitting apparatuses, and upon receiving a request for quantum key from a transmitting apparatus, determines whether the transmitting apparatus has been authenticated from the stored list of authenticated transmitting apparatuses. The QKPU determines whether the transmitting apparatus has been authenticated, and request that the QKSU distributes the quantum key to the transmitting apparatus only when it is authenticated.

The QKPU may include a state information field in the list of authenticated transmitting apparatus. Here, following the steps in the key distribution according to some embodiments, the state information is managed after being classified as "supply" at the time of processing the response of the initial request, "success" when the key sharing with a receiving apparatus is finally succeeded, and "failure" when the key sharing finally fails with a receiving apparatus. The QKPU stores status information of each transmitting apparatus in the state information field.

The QKPU and the QKSU have been shown to be present in a single device, but the present disclosure is not limited to this configuration. Some embodiments provide the QKPU separately from the QKSU.

The QKSU 214 generates a quantum key, and is responsive to a request of the quantum key from the QKPU for supplying the QKPU with the quantum key along with the identifier of the quantum key. The QKSU may store a predetermined number of quantum keys in one of its storage units after assigning a quantum key identifier to each of the quantum keys. Detailed description of respective fields of the storage units of the QKSU will be provided below in connection with FIG. 4.

Upon receiving a quantum key request signal from the QKPU, the QKSU checks a request counter. At every quantum key request signal from the QKPU, the QKSU increments the value of the request counter one by one. When the value of the request counter corresponds to a predetermined number of quantum keys that can be stored in one storage unit, the QKSU resets the value of the request counter to an initial value.

The QKSU steadily generates quantum keys regardless of a quantum key request signal from the QKPU, while it counts the number of generations of a set of quantum keys or the number of rounds of quantum key generation. It should be noted that the QKSU can get a certain amount of quantum key bits by every round of quantum key distribution. The QKSU utilizes a key accumulation counter and increments the counter value one by one for every round of quantum key generation. However, not all of quantum keys once generated are stored in the QKSU, but they are stored in the storage unit at their initial generation, or when and not until when the storage unit has supplied all of its stored quantum keys to the transmitting apparatus or the receiving apparatus and needs replenishment quantum keys. When the QKSU starts to store a set of quantum keys in one of the storage unit, it first sets a storage unit identifier 450 (described below) with the key accumulation counter and this number will be used for the quantum key identifier with the request counter whenever the QKSU responses the request of quantum key from the QKPU.

The transmitting apparatuses 230, 235 serve to transmit data or data packets by using quantum keys. At this time, the transmitting apparatus may be an encryptor which may then transmit the encrypted data or data packets after encrypting them by quantum keys.

The receiving apparatuses 240, 245 operate correspondingly with the transmitting apparatuses, for receiving the transmitted data or data packets from the transmitting apparatuses. At this time, the transmitting apparatus may be a decryptor.

Figure 3A:
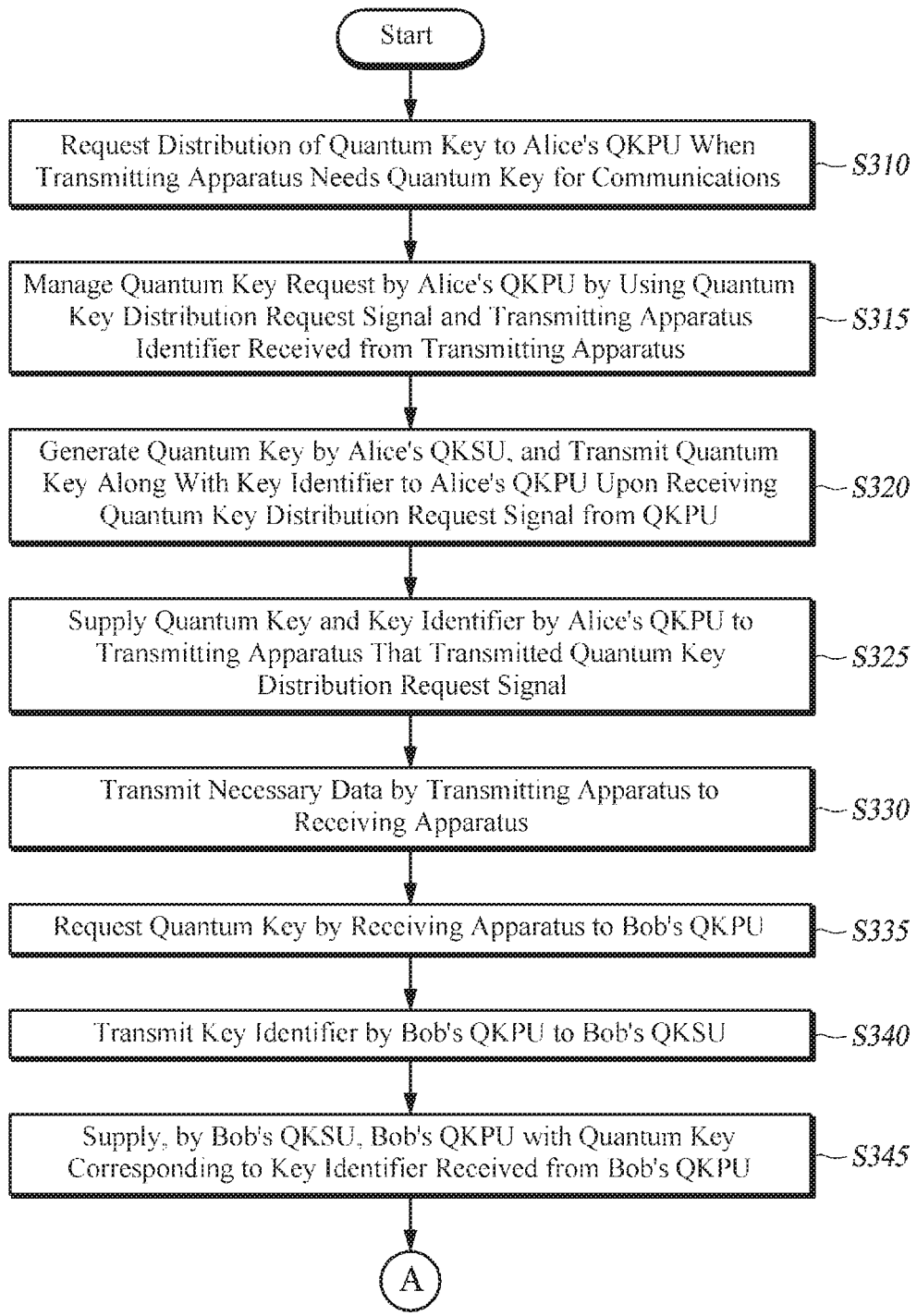
FIGS. 3A and 3B are a flowchart of a communication method using a quantum key distribution system, according to at least one embodiment of the present disclosure.
Figure 3B:
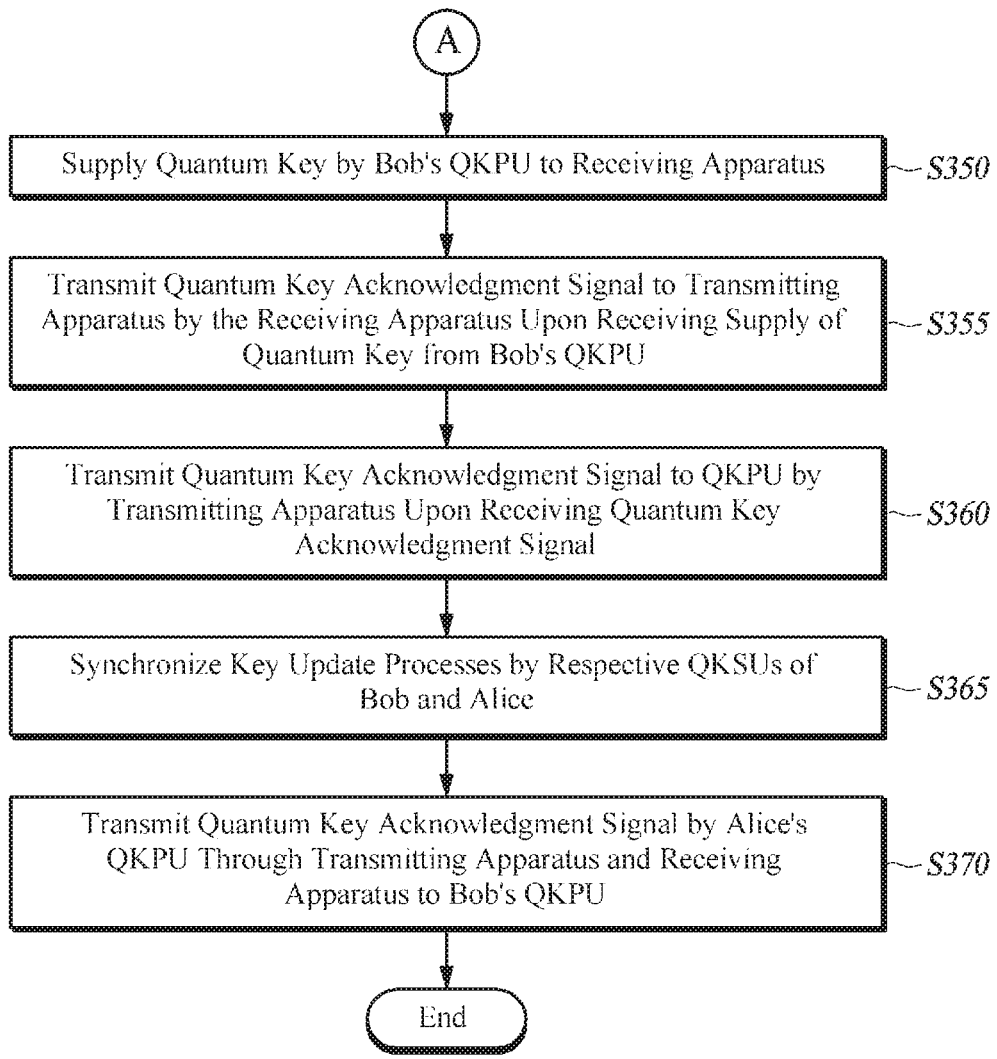

FIGS. 3A and 3B are flowcharts showing a communication method using a quantum key distribution system according to at least one embodiment of the present disclosure.

When the transmitting apparatuses need quantum keys for communications, they request the distribution of quantum keys to the Alice's QKPU in Step S310. Every time each of the plurality of transmitting apparatuses needs a quantum key, the transmitting apparatus requests the distribution of a quantum key to the Alice's QKPU. When requesting the quantum key distribution, the transmitting apparatus needs to transmit the ID (Identifier) of the transmitting apparatus along with a request signal.

The Alice's QKPU manages the quantum key request by using the quantum key distribution request signal and the transmitting apparatus ID received from the transmitting apparatus (S315). The Alice's QKPU compares the transmitting apparatus ID sent directly from the transmitting apparatus with the Alice's stored list of authenticated transmitting apparatuses, and thereby firstly determines whether the transmitting apparatus that requested the distribution of the quantum key is an authenticated transmitting apparatus. If the requester is not authenticated one, the QKPU does not process the quantum key distribution request signal of the transmitting apparatus but processes only the quantum key distribution request signal from the authenticated transmitting apparatus. Upon receiving the quantum key distribution request signal from the authenticated transmitting apparatus, the QKPU requests a quantum key from the Alice's QKSU. When the QKPU receives multiple quantum key distribution request signals from authenticated transmitting apparatuses, it performs the above described processing on the multiple signals sequentially in the order they are received.

Figure 4:
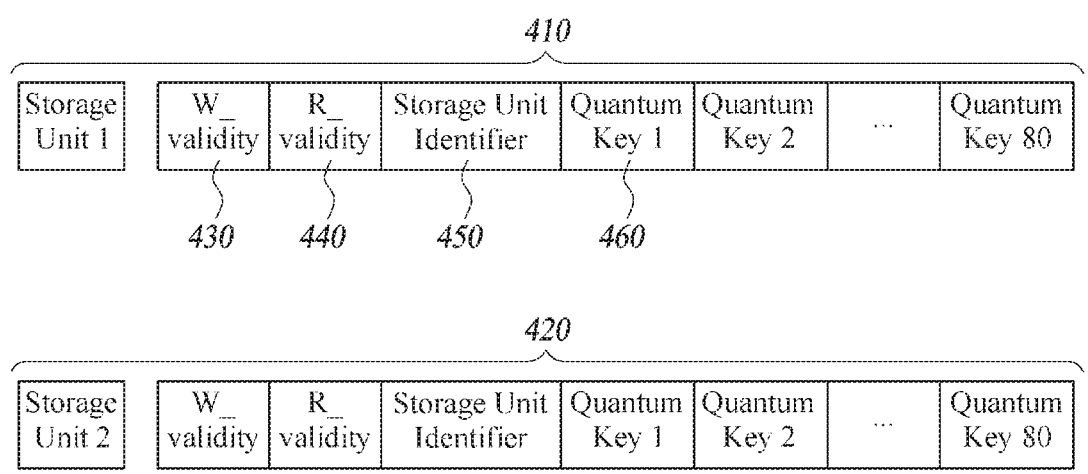
FIG. 4 is a diagram of a bank or storage units in which Alice in a quantum key distribution system stores quantum keys, according to at least one embodiment of the present disclosure.

The Alice's QKSU generates the quantum key, and transmits the quantum key along with the quantum key ID to the Alice's QKPU upon receiving the quantum key distribution request signal from the QKPU (S320). Upon receiving quantum key distribution request signals from the QKPU, the QKSU calculates the request counter and checks the storage unit ID in order to make the quantum key ID which can be simply made by concatenation of the request counter and the storage unit ID (that is, the key accumulation counter). Also, the QKSU supplies the quantum key in the quantum key field 460 corresponding to the request number with the quantum key ID to the QKPU. As shown in FIG. 4, each storage unit may have a certain number of quantum key fields 460 (in this example there are 80 quantum key fields) and this number is exactly the same as the reset number of the request counter. Since the request counter is incremented whenever the quantum key request occurs, the QKSU is able to supply each quantum key only one time.

The Alice's QKPU supplies the quantum key and the quantum key ID to the transmitting apparatus that requested the quantum key distribution (S325). Here, the QKPU corresponds, in the list of authenticated transmitting apparatuses, the quantum key ID and status information to information on the transmitting apparatus that requested the distribution of the quantum key and on the ID of the transmitting apparatus, and the QKPU stores both correspondingly correlated information additionally in the list. When the QKPU has distributed quantum keys and the quantum key IDs in response to the quantum key distribution request signals, it stores the state information field in the list, corresponding to the transmitting apparatus as "supply".

The transmitting apparatus transmits necessary data to the receiving apparatus (S330). The transmitting apparatus relays the supplied quantum key ID from the QKPU and the ID of the transmitting apparatus and the ID of a receiving apparatus to the receiving apparatus. Yet, the transmitting apparatus does not deliver the quantum key received from the QKPU. In this case, the communication method that the transmitting apparatus and the receiving apparatus utilize may be 3G, Internet, Ethernet and such existing communication methods.

At least one receiving apparatus that has received the quantum key D from the transmission apparatus requests a quantum key to the Bob's QKPU (S335). In order to request the distribution of the quantum key to the Bob's QKPU, the receiving apparatus sends a quantum key distribution request signal and the ID of the receiving apparatus, along with the quantum key ID received from the transmitting apparatus.

The Bob's QKPU transmits the quantum key ID to the Bob's QKSU (S340). The QKPU does not need to transmit all of the data received from the receiving apparatus but only the quantum key Ds among the data received from the receiving apparatus to the receiver QKSU.

The Bob's QKSU supplies the Bob's QKPU with the quantum key that corresponds to the quantum key ID received from the Bob's QKPU (S345). The QKSU utilizes the storage unit identifier and the value of the key request counter that are included in the identifier of the quantum key, to determine the identification of the quantum key, i.e., which one of a plurality of storage units and what ordinal number of the fields the quantum key is stored in. The QKSU provides information on the identified quantum key to the QKPU.

The Bob's QKPU supplies the quantum key to the receiving apparatus (S350). The QKPU delivers the quantum key supplied from the QKSU to the receiving apparatus.

The receiving apparatus transmits a quantum key acknowledgment signal to the transmitting apparatus upon receiving quantum key from the Bob's QKPU (S355).

The transmitting apparatus sends the quantum key acknowledgment signal to the QKPU of Alice upon receiving the acknowledgment signal (S360). In response to the quantum key acknowledgment signal, the QKPU stores the state information field in the list, corresponding to the authenticated transmitting apparatus that is stored in the QKPU as "success". When a failure situation occurs in the key distribution procedure, or in case the transmitting apparatus has not received the quantum key acknowledgment signal within a specified time, the transmitting apparatus regards the case as a final failure and sends the failure information to the QKPU which then stores the state information field in the list, corresponding to the transmitting apparatus as "failure". Thus, the QKPU is informed of the changes of state of the respective identifiers of the transmitting apparatus and the quantum key.

The respective QKSUs of Alice and Bob synchronize their key update processes (S365) as needed. When the respective QKSUs of Alice and Bob have consumed their quantum keys requiring replenishments with newly generated quantum keys, the respective QKSUs of Alice and Bob synchronize the key update processes.

The Alice's QKPU transmits the quantum key acknowledgment signal through the transmitting apparatus and the receiving apparatus to the Bob's QKPU (S370).

Although steps S310 to S370 are described to be sequentially performed in the example shown in FIG. 3, it merely instantiates a technical idea of some embodiments of the present disclosure. Therefore, a person having ordinary skill in the pertinent art could appreciate that various modifications, additions, and substitutions are possible by changing the sequences described in FIG. 3 or by executing two or more steps from S310 to S370 in parallel, without departing from the gist and the nature of the embodiments of the present disclosure, and hence FIG. 3 is not limited to the illustrated chronological sequence.

On the other hand, the process steps illustrated in FIG. 3 can be implemented as computer readable codes in a computer readable recording medium. The computer readable recording medium includes all kinds of recording devices storing data that can be read by a computer system. More specifically, the computer readable recording medium includes a storage medium such as a magnetic recording medium (e.g., ROM, floppy disk, hard disk, etc.), an optically readable medium (e.g., CD-ROM, DVD, etc.) and carrier waves (e.g., transmissions over the Internet). Further, the computer-readable recording medium can be distributed in computer systems connected via a network, and computer-readable codes can be stored and executed in a distributed mode.

Unlike conventional communication methods, according to at least one embodiment of the present disclosure, the communication method using a quantum key distribution system distributes quantum keys to transmitting and receiving apparatuses by using the quantum key's identifiers, which obviates the need for waiting for the determination of whether all the quantum keys have been distributed to the transmitting apparatuses and receiving apparatuses upon receiving a quantum key distribution request sent from one of the transmitting apparatuses. The quantum key distribution system according to at least one embodiment of the present disclosure consistently supplies quantum keys, and it can figure out a state transition of each quantum key by using the identifier of the quantum key. The quantum key distribution system according to at least one embodiment of the present disclosure ascertains whether the transmitting apparatus and the receiving apparatus have received the quantum keys in the end by figuring out state transitions of the respective quantum keys with the identifiers of the quantum keys.

FIG. 4 is a diagram of a bank or storage units in which Alice in a quantum key distribution system stores quantum keys, according to at least one embodiment of the present disclosure.

Referring to FIG. 4, a quantum key distribution system according to at least one embodiment has Alice provided with a plurality of storage units 410, 420 which are each configured to include a W_Validity field 430, an R_Validity field 440, a storage unit identifier field 450 and a quantum key storage field 460.

In a quantum key distribution system according to at least one embodiment, Alice has a plurality of storage units 410, 420. When Alice has distributed all of the quantum keys stored in any storage unit, an update process is needed for storing quantum keys back to the depleted storage. Here, the conventional quantum key distribution systems have a single storage unit only, and is unable to supply the quantum key at any request for quantum key until the update process is completed for new quantum keys. To solve such inconvenience, Alice in accordance with some embodiments of the present disclosure includes a plurality of storage units. With Alice including multiple storage units, when one storage unit among the plurality of storage units is depleted of the quantum keys to supply and is in need of the update process, another storage unit is responsive to the request of the quantum key distribution by the transmitting apparatus for supplying its stored quantum keys in succession to the one storage unit. The multiple storage units of Alice provide uninterrupted supply of quantum keys even if one of the storage units is in the update process. Although FIG. 4 shows only two storage units for convenience of illustration, the present disclosure is not necessarily limited thereto.

The W_Validity field 430 serves to indicate whether the quantum keys generated by a dedicated quantum key distribution protocol between Alice and Bob can be stored in the storage unit. A value 0 of the W_Validity field represents that the generated quantum key cannot be stored in the storage unit including the W_Validity field, while a value 1 represents that the generated quantum key can. In other words, every time a quantum key is generated, the QKSU checks the value of W_Validity field of each of the storage units, and stores the generated quantum key in the storage unit where the W_Validity field is valued 1. Where W_Validity fields of all of the storage units are valued 1, the QKSU sequentially stores the quantum key in each of the storage units.

The W_Validity field changes its value from 0 to 1 after supplying the last quantum key stored in the storage unit. On the contrary, when the storage unit, which had been depleted of quantum keys, has replenishment quantum keys stored to its capacity, the W_Validity field changes its value from 1 to 0.

The R_Validity field 440 serves to indicate whether the storage unit storing quantum keys can supply the quantum keys. A value 0 of the R_Validity field represents that the storage unit including the R_Validity field cannot supply the quantum key, while a value 1 represents that the storage unit can.

When the QKSU request count is initialized to have an initial value, i.e., when the requests from the transmitting apparatus cause the storage unit to be depleted of the quantum keys, the R_Validity field changes its value from 1 to 0. On the contrary, when the storage unit depleted of the quantum keys has replenishment quantum keys stored to its capacity through the updating process, the R_Validity field changes its value from 0 to 1.

Thanks to the multiple storage units provided, Alice is able to use an R_Pointer that points at the storage unit for supplying the quantum key. Since the quantum keys are first stored in all of the storage units, the R_Pointer points at an arbitrary storage unit. As a result, upon receiving a quantum key distribution request, Alice causes the storage unit, which is pointed at by the R_Pointer, to firstly supplies the quantum key. When the value of R_Validity field of the storage unit is changed from 1 to 0, i.e., when the storage unit has supplied all of the stored quantum keys, the R_Pointer changes the target storage unit it points at. However, the re-pointing of the R_Pointer to another storage unit can wait until the R_Validity field of the storage unit, which is to be pointed at by the R_Pointer, has been activated at 1.

The storage unit identifier field 450 serves to identify each storage unit among the multiple storage units provided. The storage unit identifier field identifies each storage unit to store the quantum key or each storage unit to supply the quantum key as needed. The storage unit identifier will vary according to the key accumulation count whenever a new set of quantum keys is stored by the update process.

The quantum key storage field 460 serves to store the generated quantum keys. All quantum key storage fields have their own identifier to distinguish themselves from each other. Simply, it can be done by assigning numbers in an increasing order. This identifier enables QKSU in Alice and Bob to share the same quantum key in the same key storage field without knowledge of the quantum key itself. It is because the quantum key ID consists of the storage unit ID and the key storage field number, and from these information QKSU in Bob, one can extract exactly the same quantum key storage field and quantum key field and thus the same quantum key chosen by the QKSU in Alice. Although FIG. 4 illustrates 80 quantum key storage fields, the present disclosure is not necessarily limited thereto.

Figure 5:
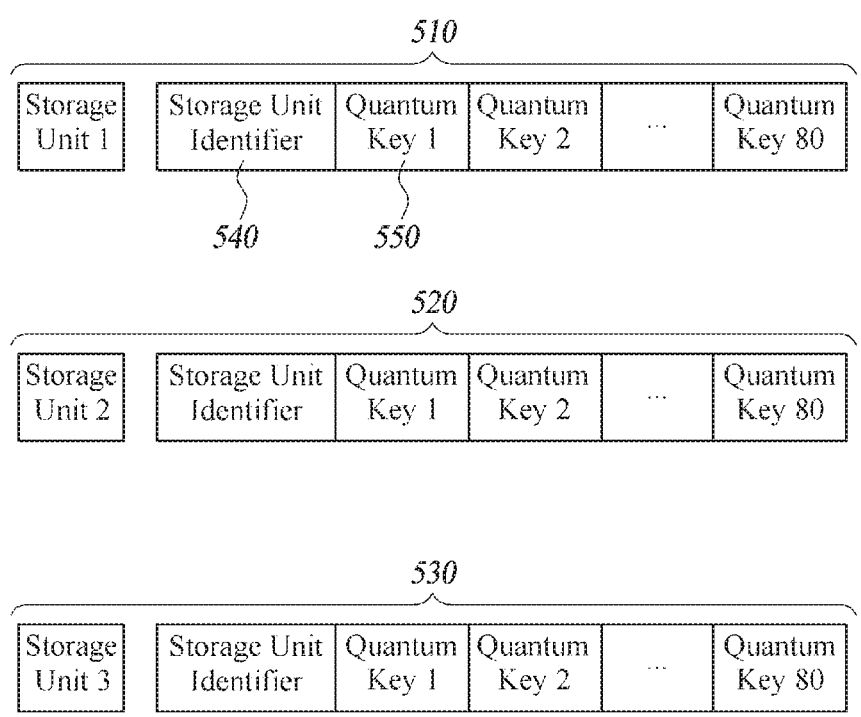
FIG. 5 is a diagram of a bank or storage units in which Bob in a quantum key distribution system stores quantum keys, according to at least one embodiment of the present disclosure.

FIG. 5 is a diagram of a bank or storage units in which Bob in a quantum key distribution system stores quantum keys, according to at least one embodiment of the present disclosure.

Referring to FIG. 5, a quantum key distribution system according to an embodiment of the present disclosure has Bob with a plurality of storage units 510, 520 and 530 each including a storage unit identifier field 540 and a quantum key storage field 550.

In a quantum key distribution system according to at least one embodiment of the present disclosure, Bob has the plurality of storage units 510, 520, 530. Bob has one more storage unit than Alice, which is detailed as follows.

In a communication system using the quantum key distribution system, the facts that the transmitting apparatus and the receiving apparatus are separated several to tens of kilometers, that the QKPU performs numerous functions other than the quantum key distribution to yield numerous interrupts, etc. lead to a time difference between the time when Alice supplies its quantum key to the transmitting apparatus and the time when Bob supplies its quantum key to the receiving apparatus. Due to the time difference between Alice and Bob supplying their quantum keys, the probability exists that the Alice's storage unit has supplied all of stored quantum keys while the Bob's storage unit still has some quantum keys to have to supply. Bob needs to have the Bob's storage remain un-updated in order to supply the remaining quantum keys without change as they are. This means that Alice and Bob cannot update their storage units at the same time right after Alice finishes supplying all quantum keys in her storage unit. This will cause a time delay. To overcome this inconvenience, Bob is given one additional storage unit, which will be used for storing new quantum keys through the key update process with Alice, right after all of quantum keys in one of Alice's storage units have been used up. The single additional storage unit of Bob initially stores no quantum key, but starts to store new identical quantum keys by the key update process requested by Alice. The previous storage unit results in continuing to supply its last quantum keys, since they still remain unchanged. Of course, the other new storage units in Bob will supply quantum keys with the new storage in Alice. In this way and cyclically, such storage unit used as the additional storage unit for the update turns into a storage unit for having the identical keys to those in the Alice's storage unit, whereas the storage unit, which had the identical keys to those in the Alice's storage unit and then has supplied all of the stored quantum keys to the receiving apparatus, turns into the additional storage unit for the next update. The point of time when Bob's storage unit turns into the additional storage unit for the update coincides the time when the Alice's QKSU in an attempt to request for an update, transmitted information of the key accumulation counter as in the process for updating subsequent quantum keys and the Bob's QKSU has received the information. Each time the QKSU of Alice requests an update, the Bob's storage unit for update is switched to another one, which occurs cyclically. In other words, the three Bob's storage units are each present in one of a 'state of storing all of the identical quantum key to those of Alice,' 'state of storing all of the identical quantum key to those of Alice,' and 'state for update,' and the state of each storage unit is cyclically switched by request of Alice.

The following describes a process according to another embodiment of the present disclosure for the storage unit of Alice and the storage unit of Bob to update their quantum keys. When the number of the quantum keys stored in the storage unit of Alice becomes the same as the value of the request counter, Alice first confirms new quantum keys being generated and then utilizes a public classical channel to transmit her key accumulation counter to Bob. After confirming his own key accumulation counter, Bob compares the Alice's transmitted key accumulation counter with his own counter. When the comparison shows the Alice's key accumulation counter is the same as the Bob's key accumulation counter, Bob sends his key accumulation counter to Alice. On the basis of the Bob's key accumulation counter, Alice and Bob proceed to update the quantum keys newly generated by the corresponding round of a quantum key distribution protocol to the key accumulation counter. Upon completion of the update, the updated storage unit of Alice changes the W_Validity to 0, and the R_Validity to 1. Incidentally, this exemplary embodiment applies exclusively to when driving a quantum key distribution protocol and where Bob has its actual quantum key generation time earlier than Alice's due to implementation issues of the system.

Although exemplary embodiments of the present disclosure have been described for illustrative purposes, those skilled in the art will appreciate that various modifications, additions and substitutions are possible, without departing from the idea and scope of the claimed invention. The exemplary embodiments of the present disclosure have been described not for limiting the idea of the disclosure but for the sake of brevity and clarity, and the idea and scope of the claimed invention are not bounded by the illustrative embodiments. Accordingly, one of ordinary skill would understand the scope of the claimed invention is not to be limited by the explicitly described above embodiments but by the claims and equivalents thereof.

The invention claimed is:

1. A transmitting apparatus of a quantum key distribution system, the transmitting apparatus comprising:
  a quantum key providing unit configured to
    receive a quantum key distribution request signal from an external transmitting apparatus, and
    transfer the quantum key distribution request signal to a quantum key storage unit; and
  the quantum key storage unit comprising a plurality of storage units and configured to
    irrespective of receiving the quantum key distribution request signal, generate quantum keys and store the quantum keys sequentially in the plurality of storage units, and
    in response to receiving the quantum key distribution request signal from the quantum key providing unit, supply a quantum key stored in one storage unit among the plurality of storage units and an identifier of the quantum key to the quantum key providing unit,
  wherein the quantum key providing unit is further configured to receive the quantum key and the identifier of the quantum key from the quantum key storage unit and provide the external transmitting apparatus with the quantum key and the identifier of the quantum key.

2. The transmitting apparatus of claim 1, wherein the quantum key providing unit is configured to store a list of authenticated transmitting apparatuses, and to transfer, to the quantum key storage unit, the quantum key distribution request signal from the external transmitting apparatus only when the external transmitting apparatus is in the list of the authenticated transmitting apparatuses.

3. The transmitting apparatus of claim 2, wherein upon supplying the quantum key and the identifier of the quantum key to the external transmitting apparatus, the quantum key providing unit stores, in the list of the authenticated transmitting apparatuses, the identifier of the quantum key and a status information of the quantum key, corresponding to the authenticated transmitting apparatus that has transmitted the quantum key distribution request signal.

4. The transmitting apparatus of claim 1, wherein the quantum key storage unit is configured so that, when one storage unit among the plurality of storage units is depleted of the quantum keys to supply, another storage unit among the plurality of storage units supplies stored quantum keys in succession to the one storage unit.

5. The transmitting apparatus of claim 1, wherein the storage units are each assigned a storage unit identifier which is distinct.

6. The transmitting apparatus of claim 5, wherein the storage unit identifier is assigned according to a key accumulation counter value which indicates a round number of a quantum key distribution protocol operated by quantum key storage units in the transmitting apparatus and a receiving apparatus of the quantum key distribution system.

7. The transmitting apparatus of claim 5, wherein the identifier of the quantum key contains an information on the storage unit identifier assigned to the storage unit in which the quantum key is stored and an information on an ordinal number of the quantum key distribution request signal in received quantum key distribution request signals from the quantum key providing unit.

8. The transmitting apparatus of claim 1, wherein upon receipt of a plurality of quantum key distribution request signals from the quantum key providing unit, the quantum key storage unit supplies the quantum keys and the identifiers of the quantum keys responsive to the quantum key distribution request signals, respectively and sequentially.

9. The transmitting apparatus of claim 1, wherein the quantum key storage unit includes a pointer which is configured to
  point at one storage unit among the plurality of storage units to distribute the quantum keys, and
  when the one storage unit has distributed all of the quantum keys, point at another storage unit among the plurality of storage units.

10. A receiving apparatus of a quantum key distribution system, the receiving apparatus comprising:
  a quantum key providing unit configured to
    receive, from an external receiving apparatus, an identifier of a quantum key having been provided by a transmitting apparatus of the quantum key distribution system to an external transmitting apparatus and finally to the external receiving apparatus, and a quantum key distribution request signal, and
    transfer the quantum key distribution request signal with the identifier of the quantum key to a quantum key storage unit; and
  the quantum key storage unit comprising a plurality of storage units and configured to
    irrespective of receiving the quantum key distribution request signal, generate quantum keys and store the quantum keys sequentially in the plurality of storage units, and
    in response to receiving the identifier of the quantum key and the quantum key distribution request signal from the quantum key providing unit, extract the quantum key corresponding to the identifier of the quantum key from one storage unit among the plurality of storage units, and supply an extracted quantum key to the quantum key providing unit,
  wherein the quantum key providing unit is further configured to receive the extracted quantum key from the quantum key storage unit and provide the external receiving apparatus with the extracted quantum key.

11. The receiving apparatus of claim 10, wherein the storage units are each assigned a storage unit identifier which is distinct.

12. The receiving apparatus of claim 11, wherein the storage unit identifier is assigned according to a key accumulation counter value which indicates a round number of a quantum key distribution protocol operated by quantum key storage units in the transmitting apparatus and the receiving apparatus of the quantum key distribution system.

13. The receiving apparatus of claim 11, wherein the identifier of the quantum key contains an information on the storage unit identifier assigned to the storage unit in which the quantum key is stored and an information on an ordinal number of the quantum key distribution request signal in received quantum key distribution request signals from the quantum key providing unit.

14. The receiving apparatus of claim 13, wherein, in response to receiving the identifier of the quantum key and the quantum key distribution request signal from the quantum key providing unit, the quantum key storage unit is configured to extract the quantum key from one storage unit of the plurality of storage units, which is pointed at by the identifier of the quantum key.

15. The receiving apparatus of claim 10, wherein the quantum key storage unit includes the storage units of a larger number than the number of storage units included in the transmitting apparatus of the quantum key distribution system.

16. The receiving apparatus of claim 10, wherein the quantum key storage unit comprises:
   storage units configured to store the quantum keys which are identical to quantum keys in the plurality of storage units included in the transmitting apparatus of the quantum key distribution system; and
   at least one additional storage unit configured to store new quantum keys by a key update process requested by the quantum key storage unit included in the transmitting apparatus of the quantum key distribution system.

17. The receiving apparatus of claim 16, wherein the storage units and the at least one additional storage unit each cyclicly changes every time the key update process is requested by the quantum key storage unit included in the transmitting apparatus of the quantum key distribution system, between a configuration for storing the quantum keys which are identical to the quantum keys in the plurality of storage units included in the transmitting apparatus of the quantum key distribution system and a configuration of the additional storage unit for the key update process.

18. The receiving apparatus of claim 16, wherein the quantum key storage unit is configured to
   count the number of times the quantum key is generated, as an accumulated count, and
   when one of the plurality of storage units included in the transmitting apparatus of the quantum key distribution system is to be filled with the new quantum keys and in responsive to transmissions of a key update process request and an accumulated count of the quantum key storage unit in the transmitting apparatus of the quantum key distribution system, compare the accumulated count of the receiving apparatus with the accumulated count of the transmitting apparatus, transmit the accumulated count of the receiving apparatus to the transmitting apparatus of the quantum key distribution system when a difference between two accumulated counts is 0 or 1, and store the new quantum keys, on the basis of the accumulated count of the receiving apparatus, in the storage unit configured to store the new quantum keys by the key update process request.

19. A method performed by a transmitting apparatus of a quantum key distribution system, the method comprising:
   receiving, by a quantum key providing unit, from an external transmitting apparatus, a quantum key distribution request signal for requesting a quantum key having been provided by the transmitting apparatus of the quantum key distribution system to the external transmitting apparatus;
   transferring, by the quantum key providing unit, the quantum key distribution request signal to a quantum key storage unit;
   irrespective of receiving the quantum key distribution request signal, generating, by the quantum key storage unit and storing the quantum keys sequentially in a plurality of storage units;
   upon receiving the quantum key distribution request signal from the quantum key providing unit, supplying, by the quantum key storage unit, a quantum key stored in one storage unit among the plurality of storage units and an identifier of the quantum key to the quantum key providing unit; and
   providing, by the quantum key providing unit, the external transmitting apparatus with the quantum key and the identifier of the quantum key.

* * * * *